UNITED STATES PATENT OFFICE.

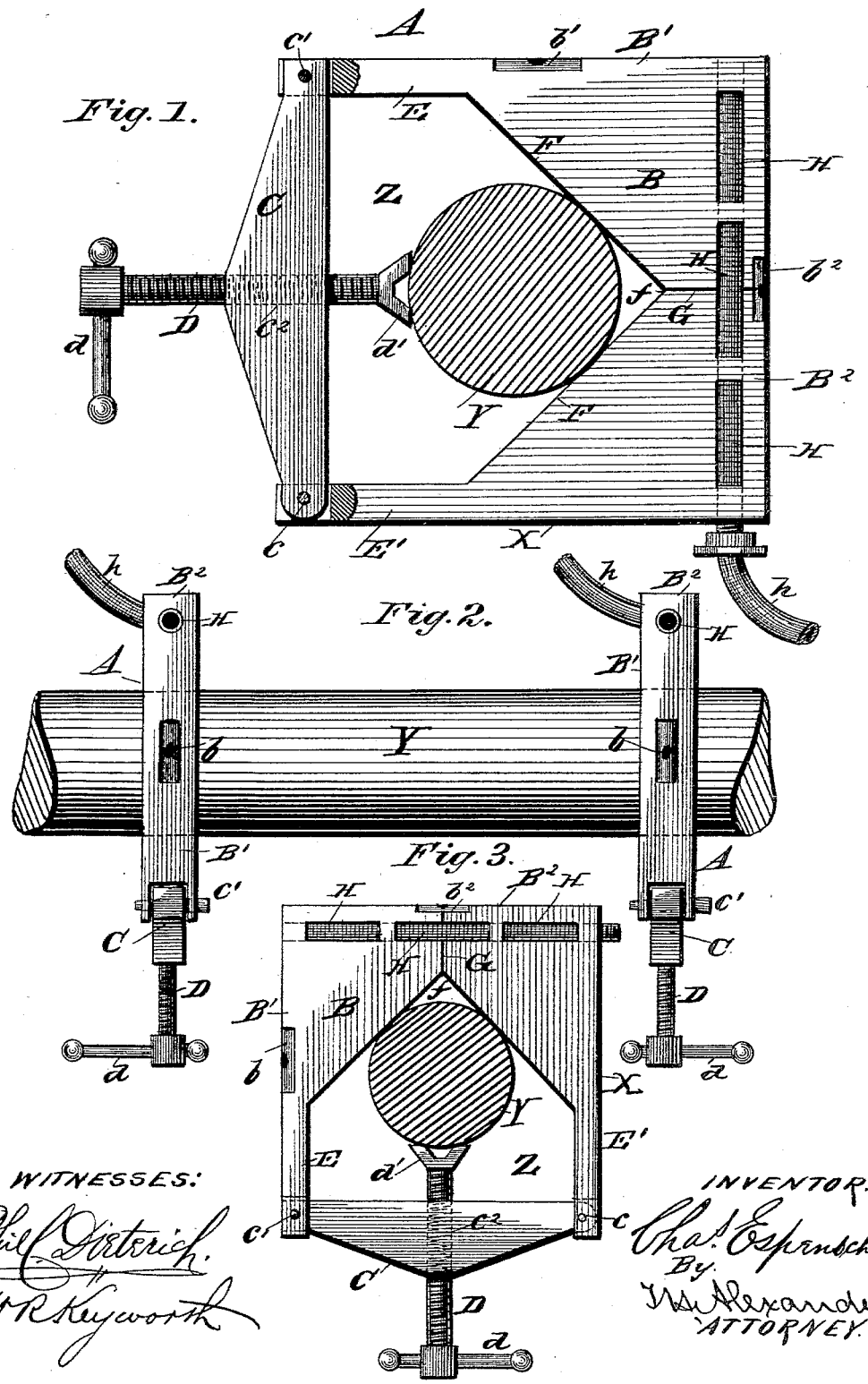

CHARLES ESPENSCHIED, OF HASTINGS, MINNESOTA.

DEVICE FOR LEVELING AND ALIGNING SHAFTING.

SPECIFICATION forming part of Letters Patent No. 318,886, dated May 26, 1885.

Application filed March 10, 1885. (No model.)

*To all whom it may concern:*

Be it known that I, CHARLES ESPENSCHIED, of Hastings, in the county of Dakota and State of Minnesota, have invented certain new and useful Improvements in Leveling and Aligning Shafts; and I do hereby declare that the following is a full, clear, and exact description thereof, reference being had to the accompanying drawings, and to the letters of reference marked thereon, which form part of this specification.

Figure 1 is a front elevation of my invention. Fig. 2 is a plan view showing the same in operation. Fig. 3 is a front elevation showing the same in position for aligning.

The invention relates to improvements in mechanism adapted to ascertain the departure of shafting from level or alignment, its object being to provide means whereby such departure can be quickly and readily discovered; and it consists in the construction and combination of two or more similar shaft-clamping devices, hereinafter described, and pointed out in the appended claims.

Referring to the accompanying drawings by letter, A represents a clamping device composed of the body-plate B, hinged or pivoted clamping-bar C, and clamping-screw D, as shown. The body-plate B is provided with the rectilinear edges $B'$ $B^2$, at right angles to each other, and respectively provided with the levels $b'$ $b^2$. The edge of the device opposite the edge $B^2$ is cut away to form the arms E E', parallel to the edge $B'$ and to each other, and the rectilinear edges F F, which run at opposite angles of forty-five degrees with the edge $B'$, and form with each other the re-entering right angle $f$, approximating the edge $B^2$. The arms E E' and edges F F form between them the recess Z.

G is a centering-mark on the body-plate, which mark runs from the edge $B^2$, at right angles thereto, to the angle $f$, in the line bisecting the said angle. The clamping-bar C is hinged or pivoted at one end, $c$, on the end of the arm E', or in a recess therein, and has its outer end passing into a recess in the end of the arm E, where it is retained, when necessary, by the pin $c'$, which passes through proper openings in the ends of the bar and arm.

$c^2$ is a transverse threaded opening in the bar C, which opening engages the clamping-screw D, which is provided on its outer end with a proper handle, $d$, and on its inner end with a clamping-foot, $d'$, to bear against the shaft Y when the device is attached thereto.

H is a graduated glass tube secured to the body-plate perpendicularly to the edge B. The said tube is open above and below, and has coupled to its lower end a rubber tube, $h$. The tubes H and $h$ are for leveling purposes, as hereinafter explained, but form no part of the invention, as the leveling can be done by any of the ordinary methods. The edge X of the body-plate is parallel to the edge $B'$, and the screw D, opening $c^2$, angle $f$, and centering-mark G are midway between said edges. While this is not essentially necessary, it is better in practice.

To level a shaft one of the described devices is clamped thereon near each of its bearings, and the edges $B'$ $B'$ of all brought horizontal by the levels $b'$ $b'$. The said edges are then all vertically equidistant from center of the shaft, and the necessary leveling, if any is required, can be given by using a straight-edge with a spirit-level attached and leveling from the top edge of one device to that of the adjacent one. If obstructions intervene, the graduated glasses H H and tubes $h$ $h$, all running to the same source of water-supply, can be used. The said glasses and tubes form part of my former application for patent.

In aligning, the devices are clamped on the shaft and the edges $B^2$ brought horizontal by the levels $b^2$. The centering-marks G G will then be vertically over the axis of the shaft, and the aligning can be done from a cord stretched between said marks, or between points equally above or to one side of the same, when obstructions intervene.

Having described my invention, what I claim is—

1. In mechanism to discover the departure from level of shafting, a clamping device provided with a rectilinear edge having a level attached to bring it horizontal, a recess, Z, having a right angle, $f$, the bisecting line of which is parallel to the rectilinear edge of the clamping device, and a clamping-screw adapted to bind the shaft against the edges F F of the recess Z, with its axis in the same horizontal plane as the bisecting line of the angle $f$, substantially as specified.

2. In mechanism to discover the departure from alignment of shafting, a clamping device provided with a rectilinear edge having a level attached to bring it horizontal, a recess, Z, having a right angle, $f$, the bisecting line of which is perpendicular to the rectilinear edge of the device, a centering-mark made on the extension of the said bisecting line, and a clamping-screw adapted to bind the shaft against the edges F F of the recess Z, with its axis passing through the vertical plane in which the centering-mark lies, substantially as specified.

3. In mechanism to ascertain the departure from level of shafting, the combination of two or more clamping devices, A, each composed of the body-plate B, clamping-bar C, and clamping-screw D, and each provided with a recess, Z, rectilinear edge B', and level $b'$, substantially as specified.

4. In mechanism to ascertain the departure from level and alignment of shafting, the combination of two or more clamping devices, A, each composed of a body-plate, B, clamping-bar C, and clamping-screw D, and each provided with the rectilinear edges B' B², levels $b'$ $b^2$, centering-mark G, and recess Z, substantially as specified.

In testimony that I claim the foregoing as my own I affix my signature in presence of two witnesses.

CHAS. ESPENSCHIED.

Witnesses:
E. C. STRINGER,
M. V. SEYMOUR.